United States Patent [19]

Efros

[11] 4,272,096
[45] Jun. 9, 1981

[54] POWERFUL OSCILLATING PEDAL BICYCLE

[75] Inventor: Boris Efros, Los Angeles, Calif.

[73] Assignee: Energenic Propulsions, Ltd., Encino, Calif.

[21] Appl. No.: 879,220

[22] Filed: Feb. 21, 1978

[51] Int. Cl.³ .............................................. B62M 1/04
[52] U.S. Cl. .................................. 280/255; 280/236; 280/251; 280/289 E
[58] Field of Search ................. 280/289 E, 251, 243, 280/236, 255; 74/594.4, 594.5, 594.6

[56] References Cited

U.S. PATENT DOCUMENTS

| 391,212 | 10/1888 | Torkelson | 74/594.5 |
|---|---|---|---|
| 527,349 | 10/1894 | Scognamillo | 74/594.6 |
| 556,545 | 3/1896 | Ljungstrom | 280/251 |
| 1,237,969 | 8/1917 | Stocks | 280/251 |
| 2,185,698 | 1/1940 | Wright | 280/251 |
| 2,449,266 | 9/1948 | Woods | 280/251 |
| 3,759,543 | 9/1973 | Clark | 280/255 |

FOREIGN PATENT DOCUMENTS

| 24298 | of 1895 | United Kingdom | 280/251 |
|---|---|---|---|
| 28759 | of 1896 | United Kingdom | 280/251 |
| 23164 | of 1897 | United Kingdom | 280/251 |
| 200385 | 11/1922 | United Kingdom | 280/251 |

Primary Examiner—John J. Love
Assistant Examiner—Donn McGiehan

Attorney, Agent, or Firm—Poms, Smith, Lande & Rose

[57] ABSTRACT

An oscillating pedal type bicycle is provided with a pedal lever having a front pedal supporting portion and a rear power transmitting portion which are rigidly connected together and which make an oblique angle with respect to one another, with the apex of the oblique angle pointing downwardly and to the rear in the intermediate position of the pedal levers. The two pedal levers each have an intermediate pivot point which is generally under the seat of the bicycle, with the rear end of the pedal lever near the driving hub of the bike and the front end of the pedal lever supporting pedals and being located close to the position of the pedals in a conventional bike during the power stroke. The power ratio of the bike may be varied by varying the position of the driving chain belt or other flexible member connected to the bicycle hub along the length of the rearwardly extending portion of each of the pedal levers. A chain positioning slider on each of the rearwardly extending portions of each pedal lever may be unlocked and moved along the length of the pedal lever by remote control operated from the handle bars or front portion of the frame of the bicycle. Each pedal lever is coupled to the driving hub of the bicycle by separate clutches for independent pedal operation. Heel clips on the pedal platforms serve to raise the pedal between power strokes.

14 Claims, 20 Drawing Figures

POWERFUL OSCILLATING PEDAL BICYCLE

FIELD OF THE INVENTION

The present invention relates to variable speed oscialting pedal type bicycles.

BACKGROUND OF T INVENTION

Conventional rotary pedal type bicycles have enjoyed wide usage over the years. They have the advantages of simplicity and ease of manufacture. However, they are also very restricted in their mode of operation and are limited in their capabilities. For example, let us consider a conventional ten-speed bike having a 27 inch wheel diameter, and a ratio of 3.6 revolutions of the rear wheel to 1 revolution of the pedals. Let us further assume that the ten-speed bike is in high gear, and that the rider is making 60 strokes per minute with each leg, or one revolution per second of the pedals. Under these conditionsthe bicycle will be travelling at a speed of approximately 17.3 miles per hour or approximately 25.4 feet per second. No flexibility is provided in the application of power to the pedals. The rider must either fully rotate his legs at the rate of 60 times a second or he cannot apply force to the rotating wheels. There is no possiblity for the rider to shorten his stroke or apply brief impulses of high power to the bike. It it not possible to apply force with both legs to the two pedals simultaneously, if this shoud be desired. The conventional bike is therefore severaly limited in its capabilities, as its mechanical limitations dictate the mode of operation of the rider.

Accordingly, an important object of the present invention is to provide a bicycle in which the rider controls the application of power to the bike, instead of having the bike dictate the mode of application of power to it by the rider.

It is also noted with regard to conventional bicycles that the diameter of the circle through which each pedal rotates is about 13 inches. Of course, power is only applied to each pedal on the downward stroke during about 180°. However, to flexibly engage the pedal during the full 360°, the toe normally engages the pedal. Now, at the top of the stroke when pressure is applied downward on the pedal, no force goes into rotating the pedal; and more generally the effectiveness of the force varies as the cosine of the angle, ranging from 100% at 0° (horizontal) to zero at plus and minus 90° when the pedal is at the top and bottom of its stroke. At plus and minus 60°, 50% of the downwardly applied force is effective; and at plus and minus 30°, about 87% of the force is effectively translated into rotational torque, neglecting friction. The average effectiveness, as a result of this factor, in a conventional bike is in the order of 70%, with 30% being lost. In addition, the need to use the toe on the pedal, to accomodate 360° pedal rotation prevents fully effective application of the strength of the leg to the pedal. It is estimated that the resultant reduction in efficiency results in an additional loss of power of more than fifty percent.

Another object of the present invention is, therefore, to increase the efficiency of the application of human power to propel a bicyle.

It is also noted that the driving mechanisms of conventional 10-speed bicycles with their many sprockets and additional parts are relatively complex, having in the order or 80 or more parts. A collateral object of the present invention is to significantly reduce the complexity of variable speed or variable ratio bikes.

As will be developed in greater detail below, the present invention involves an oscillating pedal type bicycle. A number of different kinds of oscillating pedal type bikes have been disclosed in the patent literature. However, it appears that the true capability of a properly designed oscillating pedal type bicycle has not been realized, as they are very rarely used, and are virtually never seen in competitive bike races. It is particularly interesting to note that the two most pertinent patents to the present invention which will be disclosed hereinbelow, are B. Ljungstrom, U.S. Pat. No. 556,545, patented Mar. 17, 1896, British Pat. No. 28,759 of 1896, both of which date back to the nineteenth century. Further, these patents appear to show designs which are mechanically unsound or at least inefficient, and probably inoperative.

Accordingly, another object of the present invention is to provide a practical oscillating pedal type bicycle which is mechanically sound and which has a minumum number of parts.

BRIEF SUMMARY OF THE INVENTION

In accordance with an important aspect of the invention an oscillating pedal type bicycle is provided with a pair of pedal levers, each of which has a forwardly extending pedal supporting portion and a rearwardly extending power application portion which are rigidly secured together at an oblique angle, and are centrally pivoted generally under the seat of the rider, with the apex of the oblique angle pointing downwardly and to the rear when the pedals are in their neutral position.

In accordance with another important aspect of the invention, each of the pedal levers may be operated independently, and they are coupled by separate clutches to the rear hub of the bicycle.

In accordance with another aspect of the invention the pedal levers are raised through the use of heel clips which engage the heel of the rider.

To provide variable drive ratio, the rearwardly extending portion of each of the pedal levers carries a slider which may be locked in position and moved by remote controls operated by the rider with the pedal levers in any orientation. Under the control of a cable or cables connected from the front of the bike to each individual slider, the sliders are first positively moved in one direction transverse to the pedal lever portion to unlock the slider and then the sliders are moved longitudinally to change the speed ratio.

In the implementation of the slider operation, the rearwardly extending portion of the pedal lever may include two side members, and an interconnecting transverse plate, providing a beam of H-shaped cross-section, with the transverse plate forming a camming surface to release the slider from locking recesses in the pedal lever portion. Other known beam cross-sections of "T", "U", or cross configuration may be used to provide the desired mechanical strength, locking recesses for the slider in the form of notches or holes in the beams, and transverse camming surfaces to unlock the slider.

In accordance with an additional minor feature of the invention, the pedal levers are provided with forwardly mounted foot platforms which have a pivot point about 4 or 5 inches forward from the rear of the rider's heel.

In accordance with another different aspect of the invention, the distance from the pivot point of the pedal lever to the pivot point of the pedal platform or the *radius* of the pedal motion, is preferably about 12 to 14 inches, which is approximately equal to the *diameter* between pedals of a conventional bike. The full stroke of the new bicycle extends through an arc that is less than 90° (and preferably in the order of 60°) so that more than 70% or 80% of the force applied to the pedal platform is converted into driving torque, even at the extreme top and bottom portions of the stroke, and the average efficiency is more than 90%. Using a 60 degree arc and a 12 or 14 inch radius, the stroke would be approximately 12.57 or 14.7 inches, respectively, along the circumference; while using a 90 degree arc with the 12 or 14 inch radius, the stroke would be in the order of 18.8 or 22.0 inches, respectively, along the arc.

Another advantage involves the significant reduction in distance travelled by the foot in the present bicycle, as contrasted with conventional bikes. Assuming a stroke from top to bottom of 13 inches, for both a conventional bike and for the present oscillating pedal type bike having a pedal *radius* (instead of *diameter*) equal to the same 13 inches, the distance travelled by each foot in a conventional bike will be in the order of 50% greater than with the bike in accordance with the invention. Further, as noted above, the direct extension of the leg and the application of force onto the firm pedal platform results in much higher energy conversion efficiency than is obtained with rotary pedal action using toe engagement required by conventional bikes.

Accordingly, another aspect of the invention involves the use of a pedal lever having a radius in the order of 10 or 11 inches up to about 16 or 17 inches.

The foregoing three factors deserve recapitulation: (1) The first involving the cosine factor, (2) the second involving fifty percent more travel of the feet with the old style bikes, and (3) the third involving direct leg extension onto a firm extended pedal platform, as compared with toe engagement with a narrow pedal in conventional bikes. When these three factors are taken together, the resultant bike even in the prototype stage has substantially superior performance characteristics to the best existing conventional bikes.

In accordance with another feature of the invention, the motion of the rearwardly extending portion of the pedal lever assembly is confined to the space to the rear of the seat and away from the operating positions of the rider's legs and ankles to avoid possibility of injury to the rider, and for cleaner mechanical design.

Other objects, features, and advantages of the invention will become apparent from a consideration of the drawings and from the following detailed description.

DETAILED DESCRIPTION

Figure 1:
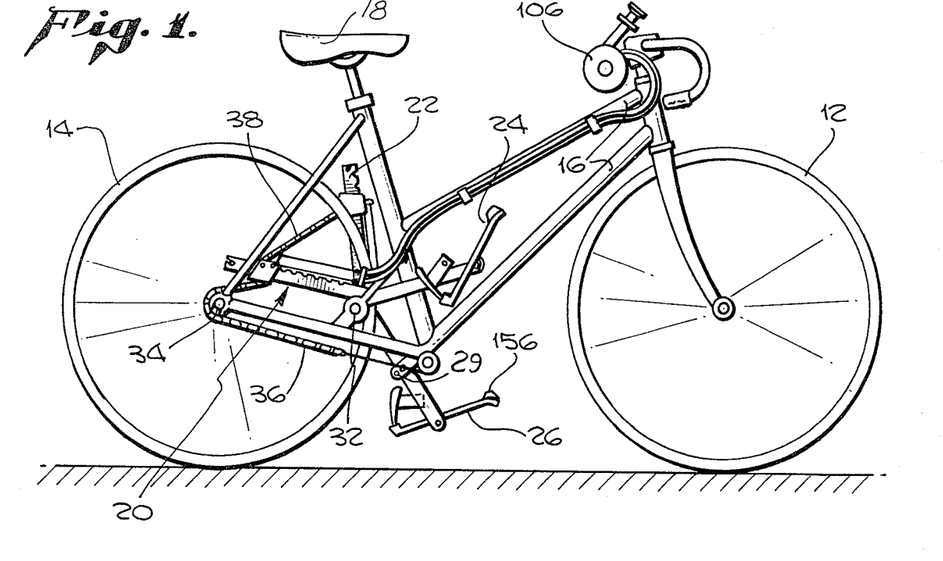
FIG. 1 is an overall diagrammatic view of a bicycle illustrating the principles of the present invention.

Referring move particularly to the drawings, FIG. 1 shows an oscillating pedal type bicycle including a front wheel 12, a rear driving wheel 14, a frame 16 which happens to be in the form of a woman's type bike, and a seat 18.

The bicycle is provided with two pedal levers 20 and 22, with the pedal lever 20 being on the near side of the bike, and pedal lever 22 being to far side of the bike frame, as shown in FIG. 1. Pivotally mounted at the front of the pedal levers are the pedal platforms 24 and 26. These pedal platforms are arranged with the pivot point in the order of 4 to 5 inches forward the position of the heel of the rider in order to provide more direct power from the rider's leg onto the front end of the pedal levers, instead of the usual application of pressure by the toe of the rider onto the pedals.

Figure 2:
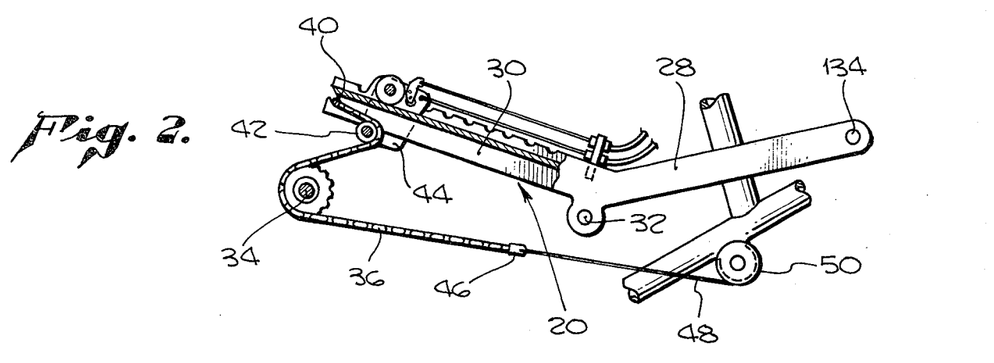
FIG. 2 is an enlarged side view of one pedal lever and associated apparatus used on the bike of FIG. 1.

The pedal lever 20 and associated mechanism are better shown in FIG. 2 of the drawings. More particularly, the pedal lever 20 includes a front pedal supporting member 28 and a rear power transmission member 30. These two members are fixedly secured together, and make an oblique angle with one another. The apex of this oblique angle points downwardly and to the rear. The oblique angle as shown is approximately equal to 150°, but it is contemplated that it could extend from about 120° to about 170°. The centrally located pivot point 32 is located substantially intermediate the two members, and secures the pedal lever 20 to the frame of the bicycle. The pedal levers are provided with lower stops, including stop 29 as shown in FIG. 1. This stops the pedal platform about three to five inches above the ground and provides a full range of arcuate movement for the pedal levers of somewhat less than 90°.

The rear wheel of the bicycle 14 is driven through clutches which are included in the hub 34. The hub 34 may be provided with two sprocket gears, one for each of the chains 36 and 38 associated with the pedal levers 20 and 22, respectively.

In one embodiment of the invention, as shown in FIG. 2, the chain 36 is secured to the end of the member 30 at point 40. It extends over roller 42 on slider 44 which is selectively locked in position at different points along the length of the driving member 30 to determine the speed or ratio of the bicycle. The other end 46 of the driving chain 36 is secured to the constant tension flat roll-type spring 48 which is mounted on drum 50, pivotally mounted on the frame.

Figure 3:
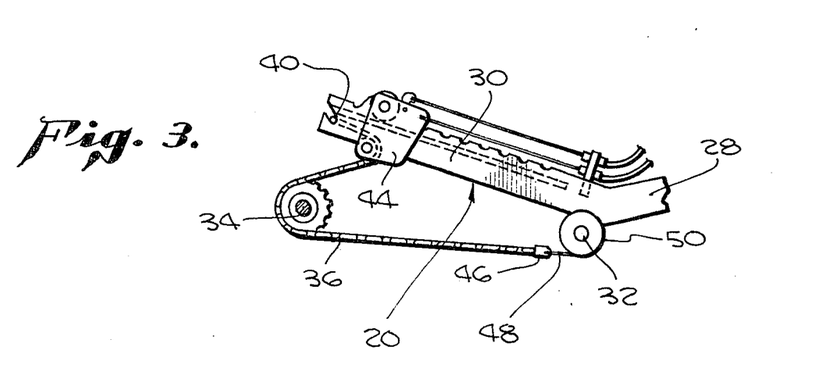
FIG. 3 shows an alternative arrangement for mounting the chain restoring spring for the present illustrative bicycle.

FIG. 3 shows a slightly modified version of the arrangement shown in FIG. 2, in which the constant tension spring 48 is mounted on the drum 32, and to the bicycle frame at the point where the pedal lever 20 is pivoted.

Figures 4, 5:
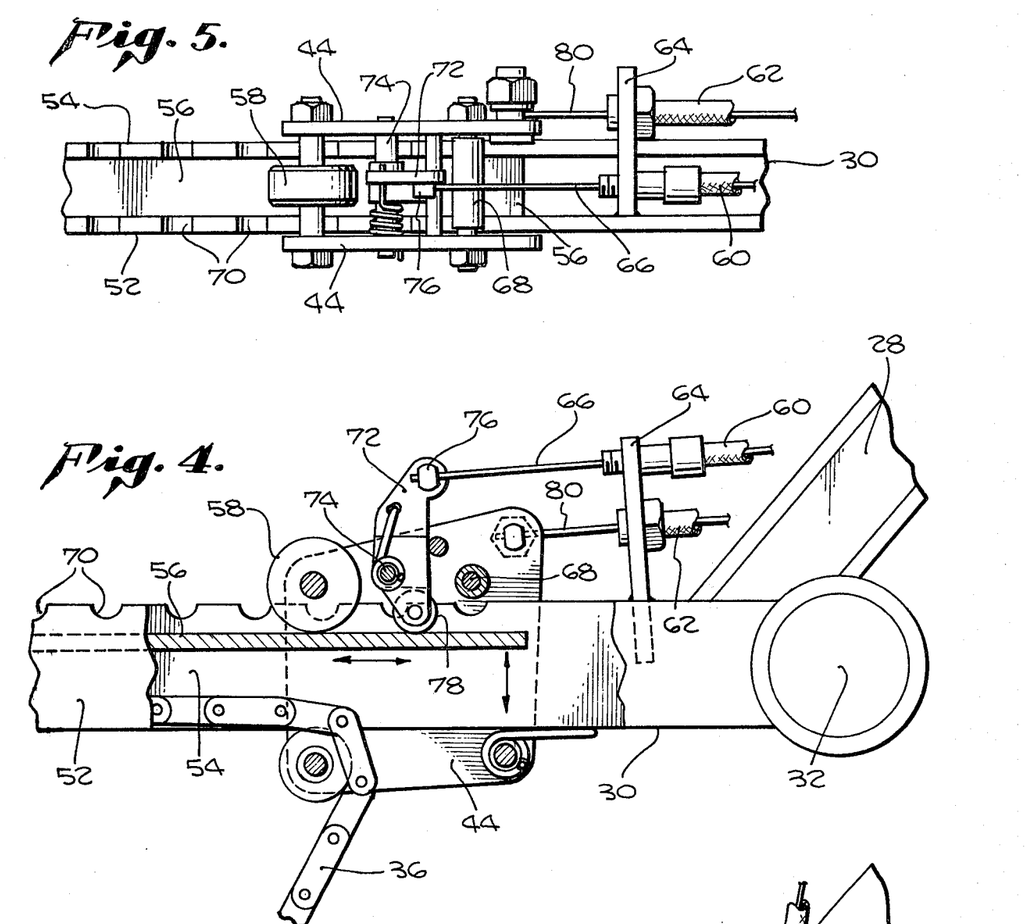
FIGS. 4 and 5 are side and top views, respectively, of the rear portion of the pedal lever and the slider mechanism for changing the speed or power ratio of the bicycle.

The details of the locking and release mechanism for the slider 44 over which the chain 36 passes are disclosed in FIGS. 4 and 5. More specifically, the chain 36 normally exerts a force directed to the left as shown in FIG. 4. The member 30 is actually made up of two side plates 52 and 54 bridged by a transversely extending plate 56 upon which the roller 58 pivotally secured to the slider 44, rides. In FIGS. 4 and 5 two cables 60 and 62 are shown with their outer coaxial sleeves secured to the pedal lever member 30 by the bracket 64. The movable wire 66 which slides within the outer housing 60 is actuated to release the slider 44 from its normally locked position in which the locking axle 68 is located within one of the recesses 70. The release function is accomplished by camming member 72 which pivots in the slider 44 at point 74. When tension is applied to the upper point 76 of the camming member 72, the rear of slider 44 is raised as the roller 78 presses against transversely extending plate 56. This action raises locking axle 68 out of the recesses 70 in plates 52 and 54 so that it is free for longitudinal movement.

With regard to longitudinal movement of the slider 44, it is normally biased to the rear by the force of the chain 36. On the other hand, the application of tension to cable 80 moves the slider 44 to the right, as shown in FIG. 4, thereby reducing the amount of travel of the chain 36 for a given angular movement of the pedal lever member 30. On the other hand, when it is desired to go faster, and to increase the ratio of wheel rotation to angular movement of the pedal lever member 30, the slider 44 is shifted to the left, and the locking axle 68 is located in one of the outer sets of recesses 70 on the member 30. This movement to the left may be accomplished by operating the release cable 66 and then relaxing tension on the cable 80 so that the slider 44 will move to the left under the force provided by the chain 36.

Figure 6:
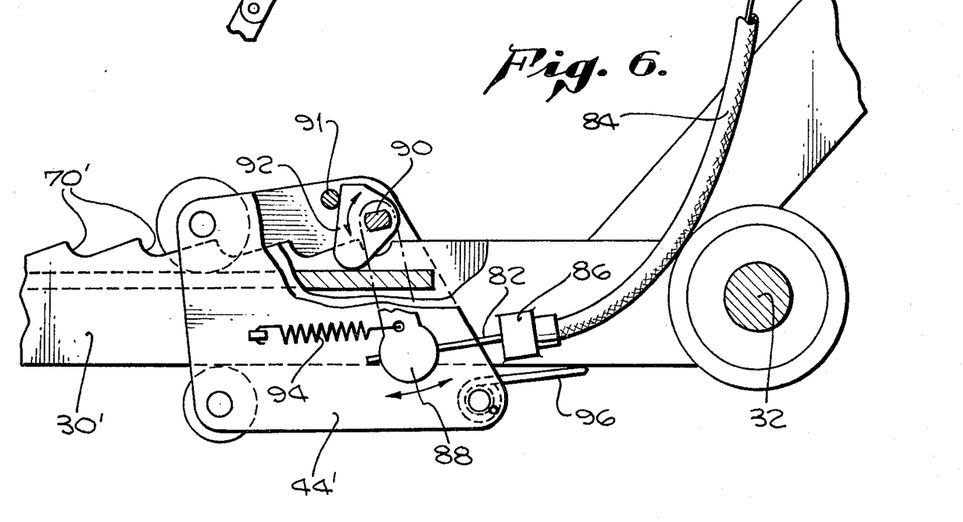
FIG. 6 is an alternative speed changing arrangement.

Referring now to FIG. 6, an alternative slider 44' is riding on the pedal lever member 30'. The pedal lever member 30' is provided with recessed 70' which are slightly assymetric, to counteract the normal biasing force exerted by the chain 36 toward the rear of the member 30'. In practice, the position of the slider 44' is controlled by the cable 82 which is movable within the outer concentric cable housing 84, which has its lower end secured to the member 30' by the bracket 86. The position of the slider 44' is controlled by the camming and control member 88, pivoted at point 90 and having the camming member 92 rigidly secured to it. The pin at point 90 normally drops down into one of the recesses 70'. However, when tension is applied to the cable 82, the member 88 and its associated cam 92 turn counterclockwise to raise the right-hand side of slider 44', and lifts the locking member at point 90 out of recess 70'. Further tension on cable 82 following engagement of camming member 88 with stop 91 shifts the slider to the right to lower speed ratio. On the other hand, after initial actuation, gradual release of cable 82 permits the movement of the slider 44' to the left, and it may be notched along to higher speeds and higher gear ratios by the successive application of light tension to the cable 82. The spring 94 normally biases the member 88 in the clockwise direction. Spring 96 normally pushes the slider 44' downwardly to insure engagement of the locking pin at point 90 in one of thr recesses 70', despite bouncing of the bicycle or other vibration.

Figure 7:
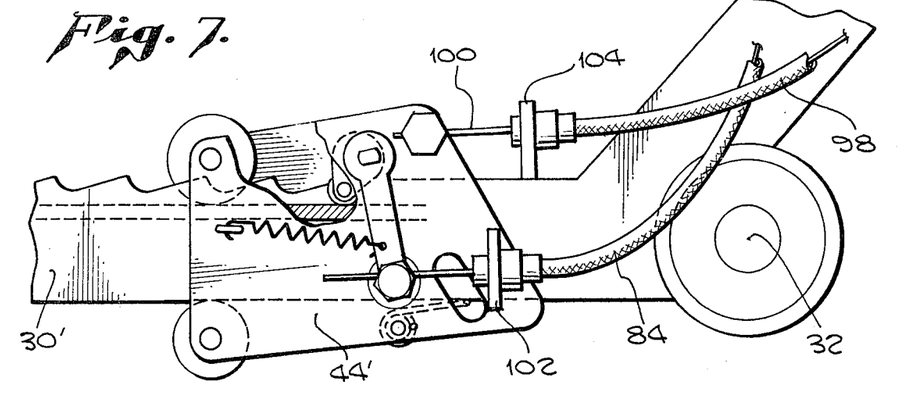
FIG. 7 is a further alternative speed or ratio changing system.

As shown in FIG. 7, the arrangement of FIG. 6 may be provided with an additional cable 98 having an inner actuating member 100 to provide separate movement control for the slider 44' along the pedal lever member 30'. Under these conditions, the cable 84 may be mounted by bracket 102 to the movable slider 44', rather than to the arm 30' as shown in FIG. 6. Of course, the end of the outer concentric sleeve 98 enclosing the tension member 100 is secured to member 30' by bracket 104.

Figures 8, 9:
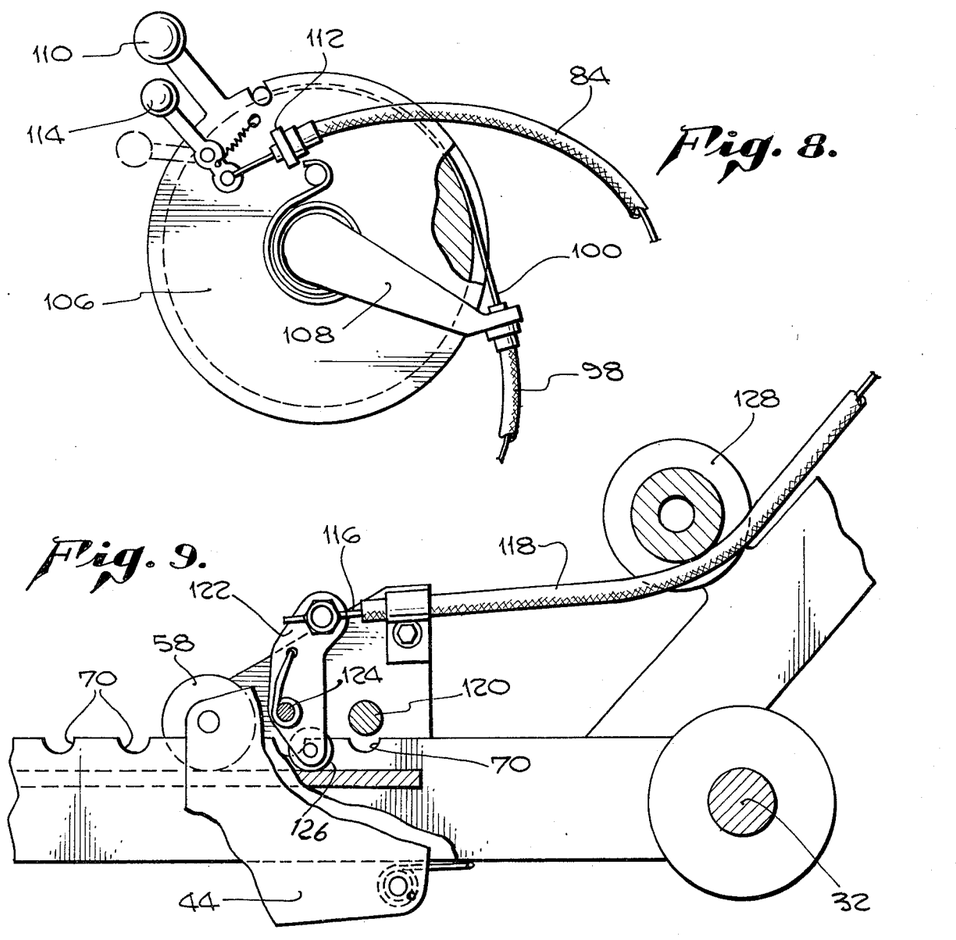
FIG. 8 is a diagrammatic showing of the controls for unlocking the speed changing mechanism and for changing the position of the slider to change the speed ratio.
FIG. 9 shows an alternative slider actuation arrangement for changing speeds.

FIG. 8 shows a cable control drum assembly 106 mounted by bracket 108 to the front frame or to the handle bars of the bicycle where it may be easily reached by the rider. Initially, it may be noted that the arrangement of FIG. 8 is intended for association with the two cable arrangements shown in FIG. 7. More specifically, note that the outer concentric housing 98 passes through bracket 108, and is therefore rigidly held to the frame of the bicycle. In order to shift the position of the slider, by moving the cable 100, the entire drum assembly 106 is rotated on the bracket 108, by grasping the handle 110. Note that the release cable is mounted by bracket 112 into the drum assembly 106 to rotate with it. Accordingly, when it is desired to unlock the slider mechanism, the smaller handle 114 is moved in the clockwise direction to apply tension to cable 66 and raise the locking axle out of the locking recess in arm 30'. Once the slider is unlocked, the speed or ratio of the bike may be changed by moving the position of the slider through the rotation of the drum assembly 106 under the control of handle 110.

Of course, with some of the other alternative arrangements, slightly different cable actuating mechanisms would be required. It may also be noted that, either one or two of the assemblies 106 may be provided. More specifically, if it is always desired to actuate both pedals with precisely the same gear ratio, then a single assembly 106 may be provided, with the cables for both of the two sliders secured thereto. However, if a rider has one leg which is somewhat weaker than the other and wishes to have a different ratio, then it is quite practical to provide two drum assemblies so that one of the pedal lever members 30 may be adjusted to a high ratio while the other is at a somewhat lower ratio.

FIG. 9 shows another alternative method for unlocking and shifting the slider mechanism 44 on the rearwardly extending portion 30 of the pedal lever which is pivoted at 32. In the arrangement of FIG. 9, the cable is provided in which the inner wire 116 and the outer concentric portion of the cable 118 move together in order to change the position of the slider 44, but the inner wire 116 is shifted relative to the outer concentric portion 118 in order to unlock the detente 120 from the recess 70 in which it is seated when in the locked position. More specifically, as in the case of certain of the earlier embodiments, the slider 44 is provided with the wheel 58 which rides on the cross plate 56, and the release mechanism 122 is pivoted about point 124 under the control of cable 116 to force wheel 126 into engagement with the plate 56 so that detente 120 is raised out of any one of the recesses 70 in which is may be locked. Thereafter, the entire cable 118 and 116 is moved to permit the slider 44 to move along the rearwardly extending portion 30 of the pedal lever. This movement of slider 44 on number 30 may be either under the force of the chain 36, as described above, which would move the slider to the left as shown in FIG. 9, or by rotation of a drum on which the cable 118 and wire 116 may be wrapped, to move it to the right as shown in FIG. 9 against the spring pressure on the chain 36. In practice, the actuating mechanism for the concentric cables 116 and 118 of FIG. 9 may be substantially as shown in FIG. 8, with the entire cable including the outer concentric portion 118 being secured in a manner similar to cable 84 as shown in FIG. 8 to extend around and be actuated in its entirety by the rotation of the drum 106, but with the lever 114 supplementally moving the inner cable 116 relative to the outer concentric portion 118 which is fixed to the drum (not the frame of the bicycle). Of course, with the arrangement of FIG. 9, the outer concentric portion 118 of the cable must move longitudinally, and rollers such as the externally grooved roller 128 shown in FIG. 9 are provided on the frame of the bicycle between the drum 106 and the pulley or roller 128.

Figures 10, 12:
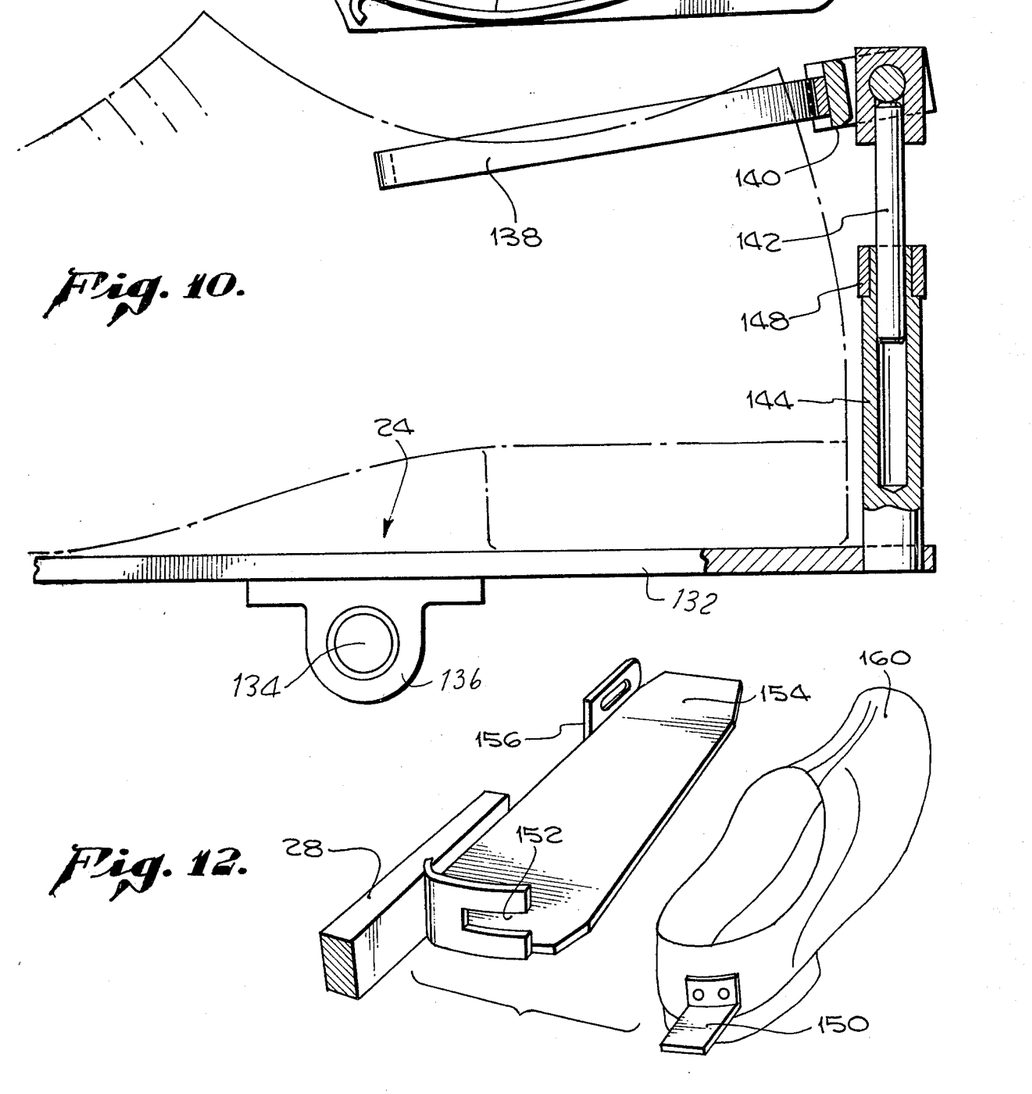
FIGS. 10 and 11 are side and top views, respectively, of pedal platforms for supporting the feet at the front end of the pedal levers and heel clips associated with the pedal platforms.
FIG. 12 shows an alternative pedal lever platform and associated heel engagement arrangements.
Figure 11:
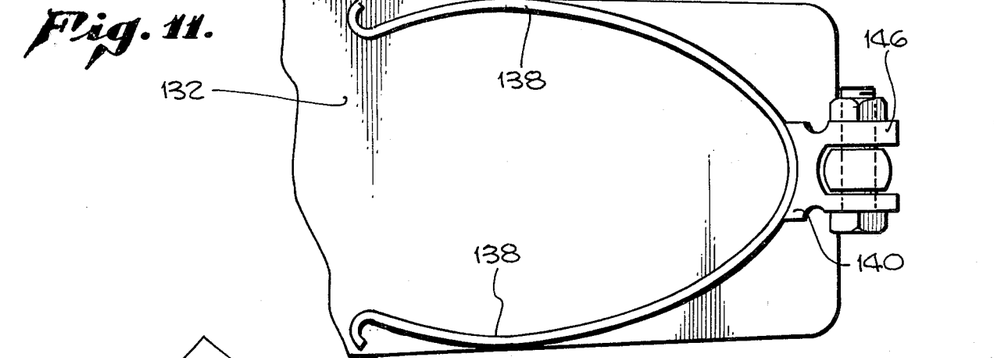

FIG. 10 is a schematic showing of one of the pedal platforms 24 pivotally mounted at the front end of forwardly extending portion 28 of the pedal lever 20, as shown in FIGS. 1 and 2. Referring again to FIG. 10, the pedal platform assembly 24 includes an underlying plate 132 which is pivotally mounted to the forward pivot point 134 (see FIG. 2) by bracket 136. Heel clips 138 are preferably provided for each of the pedal assemblies, such as assembly 24, and these may be adjustably mounted to the underlying plate 132 by the bracket 140 pivotally secured to the vertically extending member 142, which is in turn adjustably mounted to extend within the hollow lower support member 144. The spring heel clips 138 may be adjusted to the proper size for the rider and then clamped in the proper position by the clamping mechanisms 146 and 148 which may be of any suitable configuration. As previously mentioned, it has been determined that the preferred way of raising the pedals and restoring them to their upper positions between strokes is through the use of heel clips secured to the heels, and by providing the motive power by the rider. This permits freedom of control by the rider without arbitrary constraint forced upon the rider by the mechanism of the bike. Other oscillating pedal type bikes have provided restoring springs, or interconnecting mechanisms whereby the depressing of one pedal raises the other pedal; however, such arrangements have introduced unnecessary back or reverse pressure, or have unduly constrained the mode of operation of the bike. Accordingly, the inventor has determined that restoration under the control of the rider through the use of heel clips, such as those shown in FIGS. 10 and 11, are to be preferred.

FIG. 12 shows an alternative arrangement in which a special shoe is provided with a metal attachment 150 for engaging the slot 152 mounted at the rear of the pivoted pedal platform 154. As in the previous example, the pedal platform 154 is pivotally mounted on the forwardly extending portion 28 of the pedal lever. An additional bracket 156 is provided for engagement with the front left-hand side of the shoe 160. The arrangement of FIG. 12 is primarily intended for racing bike users in which special shoes may be employed.

Figures 13, 14:
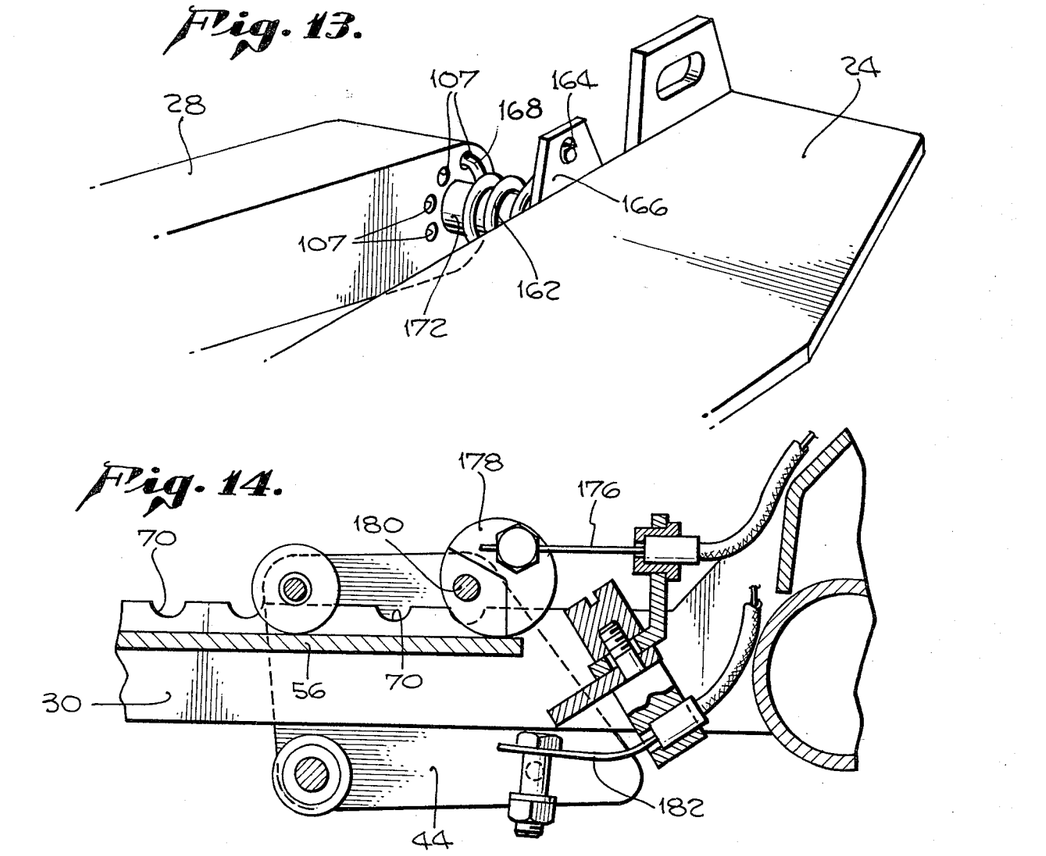
FIG. 13 is a diagrammatic showing of arrangements for orienting the pedal platform relative to the pedal lever.
FIG. 14 is a futher alternative speed changing arrangement.

FIG. 13 is a diagrammatic showing of the mode of biasing or orienting the pedal platforms, such as pedal platform 24 mounted at the front end of the forwardly extending portion 28 of pedal lever 20 (see FIGS. 1 and 2). In FIG. 13 a torsion spring 162 is employed to orient the pedal platform 24 relative to the pedal lever 28. More specifically, in the absence of the torsion spring 162, the high center of gravity of the pedal platform assembly 24 could turn it over so that a rider could not easily place his foot upon it. Accordingly, the orientation of the pedal platform assembly 24 relative to the end of the forwardly extending portion 28 of the pedal lever is determined by the torsion spring 162. One end of the torsion spring 162 extends through the opening 164 in the upwardly extending bracket 166 forming part of the pedal platform assembly 24. The other end 168 of the torsion spring 162 may be inserted into any one of a series of holes 170 in the end of the pedal lever, so that the proper angular orientation of the pedal platform assembly is obtained. In practice, instead of being located immediately between the pedal platform assembly and the front end of the pedal lever, and taking up the considerable amount of lateral space shown in FIG. 13, the spring can be of greatly reduced extent, and may be on the inner side of the front end of the pedal levers, with the pivot rod 172 extending through to the left-hand side of pedal lever portion 28, as shown in FIG. 13, and being rigidly secured to the pedal platform assembly 24. The torsion spring could then be secured to the pivot rod 172 and hold it in the desired orientation relative to the pedal lever.

FIG. 14 shows yet another arrangement for unlocking the slider 44 from the rearwardly extending pedal lever member 30 and shifting its longitudinal position. More specifically, in the arrangement of FIG. 14, unlocking is accomplished by the cable 176 which rotates the circular camming member 178 about the combined pivot point and locking rod 180. FIG. 14 shows the locking rod 180 raised up out of the locking recesses 70, with the roller 178 riding on the transversely extending plate 56. With the slider 44 unlocked from the rearwardly extending member 30, the position of the slider 44 may be moved by actuation of the cable 182, the outer concentric portion of which is secured to the member 30. By rotating the drum 106, as shown in FIG. 8, with the release lever 114 depressed, the slider may be moved to the left or right to change the speed ratio of the bicycle. FIG. 14 is of interest in showing an arrangement in which the speed ratio control cable 182 operates below the member 30, while the release cable 176 operates above the member 30.

Figure 15:
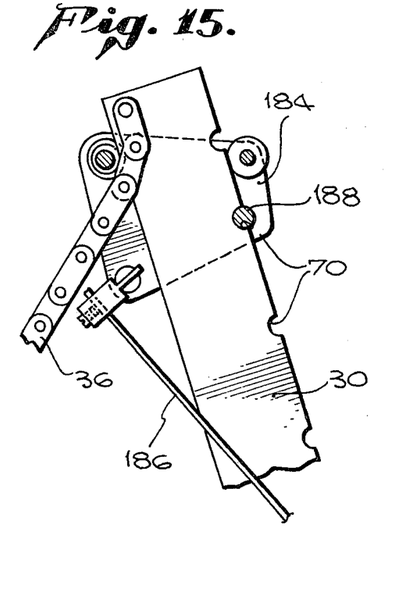
FIG. 15 shows a single cable speed changing arrangement.

FIG. 15 is of interest in showing an arrangement in which a slider 184 is moved along the rearwardly extending member 30 by a single movable cable 186. In operation, the detente 188 is initially raised up out of the recess 70 in which it is located, and then the slider 184 moves to the right as shown in FIG. 15, to shift the detent 188 to the next subsequent locking recess 70.

Further, when it is desired to shift the bicycle to a higher speed ratio, the cable 186 may be momentarily pulsed, and then released so that the detent 188 would move upward and to the left as shown in FIG. 15 under the pressure of the chain 36.

Figure 16:
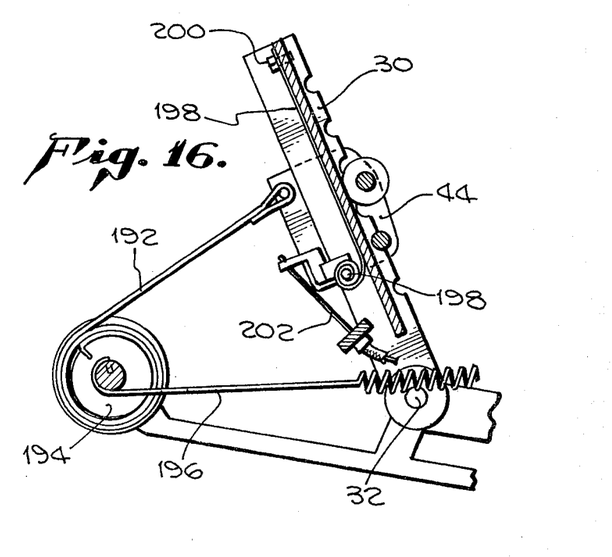
FIG. 16 shows an alternative drive arrangement using belting instead of chains.

FIG. 16 shows an alternative arrangement in which a flexible belt or cable 192 is employed instead of the chain 36 shown in other embodiments of the invention. The belt 192 is secured to and wraps around the hub 194 at the rear wheel of the bicycle. The hub 194 is coupled to the rear wheel by means of a roll type locking clutch with very little back play, as will be described below. The hub 194 is biased in one angular orientation by the spring return 196 which is indicated schematically in this figure. A flat constant force spring 198 is secured to the outer end of member 30 by bolt 200, and is pivotally mounted on the slider 44 to bias it toward the end of member 30. Cable or belt 202 is actuated to both unlock and move the slider 44 along the length of the member 30, as in earlier embodiments of the invention.

Figure 17:
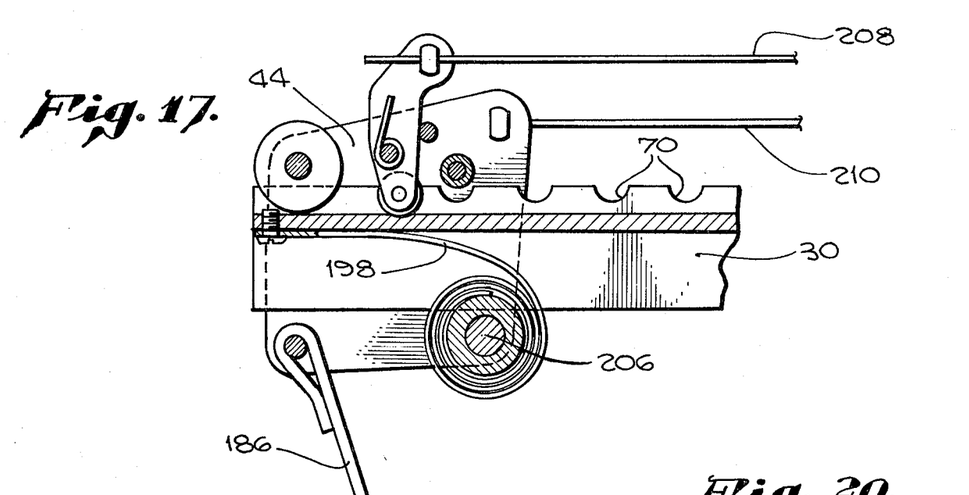
FIG. 17 shows an alternative arrangement in which the driving belt is secured to the slider of the speed changing mechanism.

FIG. 17 shows another embodiment of the invention employing a drive belt, instead of a chain. The drive belt 186 is secured to the movable slider 44, which as shown is mounted near the outer end of the rearwardly extending portion 30 of the pedal lever. The constant force spring 198 is secured to the outer end of the member 30, and is rotatably mounted on the slider 44 at pivot point 206 to urge the slider 44 toward the outer end of member 30. Locking and unlocking of the slider 44 is accomplished by cable 208 in a manner discussed hereinabove in connection with other embodiments of the invention, and movement of the slider 44 along the length of member 30 is accomplished by the cable 210.

Figure 18:
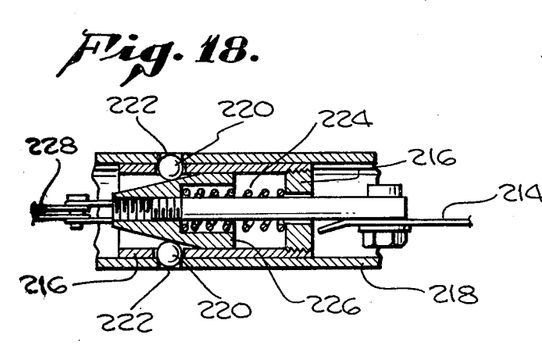
FIG. 18 shows one additional speed changing arrangement.

FIG. 18 shows an alternative arrangement in which a single cable 214 performs both the unlocking and the control function for moving a slider 216 in a rearwardly extending portion 218 of a pedal lever. In FIG. 18, as shown, the balls 220 extend outwardly into the locking recesses 222 in member 218. When the cable 214 is tensioned and moved to the right, the initial action is to compress spring 224, with element 226 moving to the right to engage the main portion of slider 216 which lies to the right of the movable member 226. When this occurs, the balls 220 move inwardly to release the slider 216 so that it may move either to the right under continued tension exerted on cable 214, or to the left under the force of the chain or belt 228 secured to the slider 216.

Figure 19:
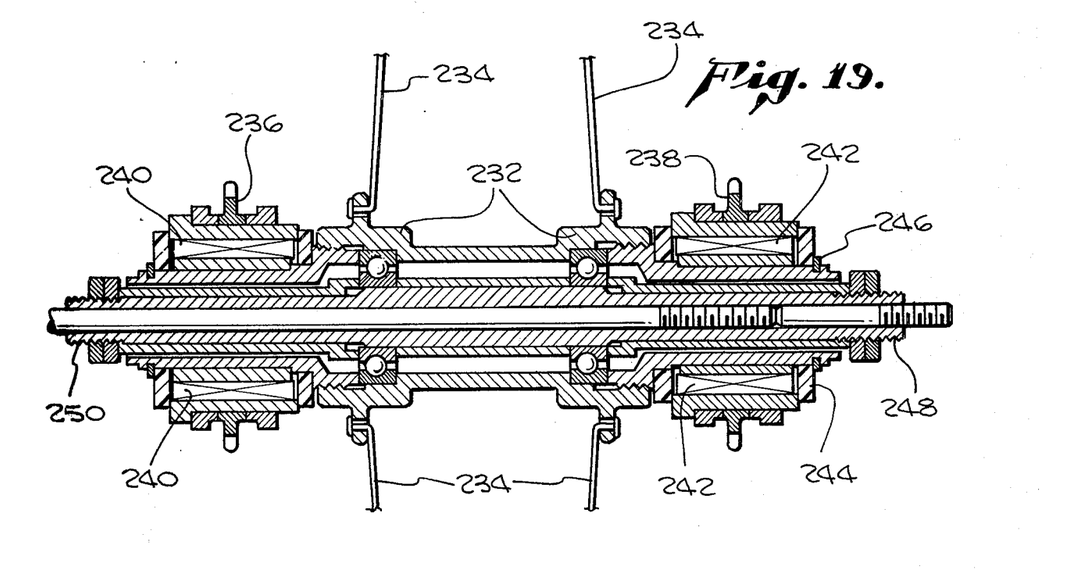
FIG. 19 is a cross-sectional view of the dual clutch mechanism for supplying power from each of the two chains connected to the respective pedal levers to the rear wheel.

FIG. 19 shows the rear wheel hub assembly. More specifically, the wheel hub 232 supports the spokes 234 which extend outwardly and are connected to the rim of the wheel which carries the tire. The two outer sprockets 236 and 238 receive the chains which are connected to the rearwardly extending portions of the pedal levers 20 and 22 as shown in FIG. 1. Immediately within the sprockets 236 and 238 are the roller clutches 240 and 242, respectively, which transmit torque in a unidirectional basis to the wheel hub 232. Roller clutches perform a function similar to a ratchet in that torque is transmitted in one direction, but not in the other. However, roller clutches of modern design have virtually no lost motion and are virtually instantaneously put into operation upon reversal of motion. Typical clutches which are suitable are disclosed in Torrington Catalog No. RC-8. Mounted outside the clutch 242 is a plastic washer 244, which is held in place by a retaining ring 246. A similar washer and retaining ring is located at the other end of the assembly. The frame of the bicycle is mounted on the threaded surfaces 248 and 250, and is held in place by the usual retaining nuts. The other components shown in FIG. 19 are generally conventional.

Figure 20:
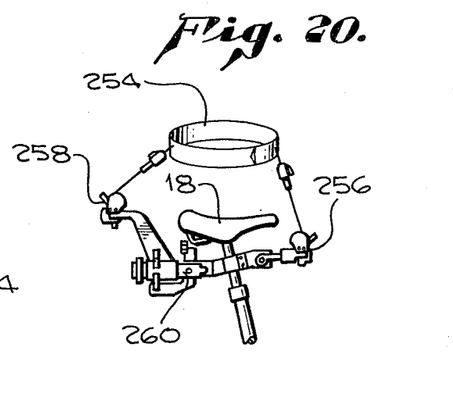
FIG. 20 shows a seat belt arrangement which may be used with the bike of FIG. 1.

FIG. 20 shows a seat belt 254 for use with the seat 18 as shown in FIG. 1. Seat belt 254 is provided with quickly releasable arrangements 256 and 258 which permit ready release of the seat belt from the bicycle in case of emergency. The seat belt 254 permits the application of greater force to the pedal platforms 24 and 26 than is possible when only the weight of a person's body is applied to the pedal platforms.

In closing, certain features of the invention and their significance may be noted. First, as a result of the configuration of the rearwardly extending portions of the pedal levers, such as portion 30 of pedal lever 20, the driving chain 36 may be relatively short. More specifically, it is preferably in the order of 16 to 20 inches long for a 27 inch wheel, with a shorter range of lengths being appropriate for smaller bikes, or bicycles with a reduced range of speed ratios. This short length precludes the transverse vibrations which tend to plague the operation of bicycles having extended tension member. In addition, the inertia of the reciprocating chain assembly is held to a minimum in that the only other working part that moves back and forth with it is the sprocket gear on hub 34, the flat constant tension spring 48, and the lightweight coupling between spring 48 and the short bicycle type chain 36. Incidentally, the spring 48 has a tension of only about three and one-half pounds, and is preferably between two and one-half and five pounds.

Another minor feature involves the provision of the vertical toe plates such as 156 on the inner side of the pedal platforms, to prevent inadvertent inward sliding of the front of the shoe into engagement with the frame of the bicycle. Reference is made to my related copending U.S. Patent Application Ser. No. 774,620, filed Mar. 4, 1977 now U.S. Pat. No. 4,161,328.

In conclusion, it is to be understood that the mechanical arrangements as described hereinabove are illustrative of the principles of the invention. Other alternative mechanical arrangements may be employed to implement the general principles as outlined herein, and such alternatives are considered to be within the spirit and scope of the invention.

I claim:

1. An oscillating pedal type bicycle comprising:

a bicycle having a frame, front and rear wheels, and a seat;

a pair of pedal levers each having a front portion and a rear portion, rigidly connected together and having an intermediate pivot point;

means for pivotally mounting said pedal lever on said frame;

individual pedal means mounted toward the front of said pedal levers;

means including a bicycle chain for coupling the rear portion of each of said pedal levers to drive the rear wheel of said bicycle;

means for shifting the speed ratio of said bicycle by changing the effective connection point of said driving means along the length of said rearwardly extending portions of said pedal levers, said speed changing means including mechanical slider means mounted for movement along each of said rearwardly extending portions of said pedal levers, means including recesses in said pedal levers for securely and firmly locking said mechanical slider means in place and for unlocking them, said locking and unlocking means including separate mechanical means independent of said chain means for exerting force between said slider means and said rear portions of said pedal levers, and means for remotely unlocking said mechanical means and shifting their positions to change speed ratios.

2. An oscillating pedal type cycle as defined in claim 1 wherein said front and rear portions of said pedal levers are self-supporting and free of braces extending from the front to the rear portion of each said pedal lever, whereby manufacture, repair, and use of said cycle are facilitated.

3. An oscillating pedal type bicycle as defined in claim 1 wherein said rearwardly extending portion of said pedal lever is of mechanical beam type cross-section including two or more longitudinally extending structural members, and wherein camming means are provided for riding on one of said longitudinally extending members to unlock said slider under the control of said cable means and to hold the slider unlocked while the speed ratio is being changed.

4. As oscillating pedal type bicycle as defined in claim 1 wherein said shifting means includes cable means connected to each said slider.

5. An oscillating pedal type bicycle as defined in claim 1 wherein said unlocking and shifting means includes camming means for moving said slider transverse to the longitudinal axis of said rear portion of said pedal lever to unlock said slider.

6. An oscillating pedal type bicycle as defined in claim 3 wherein said rearwardly extending portion of said pedal lever is of H-shaped cross-section.

7. An oscillating pedal type bicycle as defined in claim 3 wherein a separately movable camming means is mounted on each said slider to unlock it, and cable means is connected directly to each said camming means.

8. An efficient oscillating pedal type cycle comprising:
a cycle having a frame, front and rear wheels, and a seat;
a pair of pedal levers each having a front member and a rear member rigidly connected together, and having an intermediate pivot point substantially where said two members join;
pedal means mounted near the front end of each of said front members of said pedal levers;
chain means having one end coupled to the rear member of each of said pedal levers at a driving point to drive the rear wheel of said cycle;
means including a constant force spring connected to the other end of said chain means for maintaining said chain means under tension;
the angle including said pivot point of said pedal levers as an apex and extending from said driving point on the rear member to the mounting point for said pedal means on the front member, being an oblique angle, directed downward and to the rear when said pedal levers are in an intermediate position; and
means for mounting each said pedal lever on said frame with said pivot point located generally under said seat with the apex of said oblique angle extending generally downward and to the rear when the pedal lever is in an intermediate position;
means for providing oscillating motion for said pedal means in a circular arc having a radius between 10 and 16 inches with a rotation about said pivot point of between approximately sixty and ninety degrees;
means for providing a range of movement for said rearwardly extending portion of said pedal lever to a point near and above the hub of said rear wheel at its most rearward point of oscillation, and to a point approaching the vertical in its most forward point of oscillation but not into the zone in front of the seat where the rider's legs or ankles could be contacted; and
means for changing the speed ratio of said cycle by changing the effective connecting point of said chain means along the length of said rearwardly extending members of said pedal levers, said speed changing means including a slider mounted on each of said rearwardly extending members of said pedal levers;
means for securely, firmly and positively locking said sliders in place onto said pedal levers to preclude rattling and vibration in applying power to said bicycle, and for unlocking said sliders;
cable means connected to each of said sliders for remotely actuating said locking and unlocking means to the unlocked position and for shifting the positions of said sliders to change speed ratios;
said slider locking and unlocking means including separate mechanical means independent of said chain means for exerting force between said sliders and said rear members of said pedal levers; and
said cycle including means for operating said pedal levers independently of one another, whereby said pedals may be operated with different length strokes, or together, or alternately with equal length strokes, and with the pedal raising motion at a different speed than the power stroke.

9. An oscillating pedal type bicycle as defined in claim 8 wherein said rearwardly extending portion of said pedal lever is of mechanical beam type cross-section including two or more longitudinally extending structural members, and wherein said slider locking and unlocking means includes camming means movable with respect to said slider and riding on one of said longitudinally extending members to unlock said slider under the control of said cable means and to hold the slider unlocked while the speed ratio is being changed.

10. An oscillating pedal type bicycle as defined in claim 8 wherein unidirectional roller type clutch means with minimum back-play are provided for driving said rear wheel from said respective chain means.

11. An oscillating pedal type bicycle as defined in claim 8 wherein said oblique angle is in the order of 120 degrees to 170 degrees.

12. An oscillating pedal type bicycle as defined in claim 8 further comprising pedal plaforms including heel clip means for engaging the heel of the rider, pivotally mounted at the front end of said pedal levers.

13. An oscillating pedal type bicycle as defined in claim 8 further comprising means for restoring the front of said oscillating pedal levers to their upper positions consisting principally of means for engaging the foot or the shoe of the rider, whereby the upward movement of the rider's foot restores the pedal levers following each power stroke.

14. An efficient oscillating pedal type cycle comprising:
a cycle having a frame, front and rear wheels, and a seat;

a pair of pedal levers each having a front member and a rear member rigidly connected together, and having an intermediate pivot point substantially where said two members join;

pedal means mounted near the front end of each of said front members of said pedal levers;

chain means having one end coupled to the rear member of each of said pedal levers at a driving point to drive the rear wheel of said cycle;

means including a spring having a maximum force of less than five pounds connected to the other end of each of said chain means for maintaining said chain means under tension;

means for mounting each said pedal lever on said frame with said pivot point located generally below said seat;

means for providing a range of movement for said rearwardly extending portion of each said pedal lever to a point near and above the hub of said rear wheel at its most rearward point of oscillation, and to a point approaching the vertical in its most forward point of oscillation but not into the zone in front of the seat where the rider's legs or ankles could be contacted;

movable slider means for changing the speed ratio of said cycle by changing the effective connection point of each of said chain means along the length of each of said rearwardly extending members of said pedal levers;

means for securely, firmly and positively locking said movable speed ratio changing means in place onto said pedal levers to preclude rattling and vibration in applying power to said bicycle, and for unlocking said slider means;

cable means connected to each of said slider means for remotely actuating said locking and unlocking means to the unlocked position and for shifting the positions of said slider means to change speed ratios;

said cycle including means for operating said pedal levers independently of one another, whereby said pedals may be operated with different length strokes, or together, or alternately with equal length strokes, and with the pedal raising motion at a different speed than the power stroke; and said pedal means including means for engaging the feet of the rider for rapid raising of said pedals, and also including means for permitting quick disengagement of the feet from said pedals for safety purposes.

* * * * *